(12) United States Patent
Bümmerstede

(10) Patent No.: US 7,256,729 B2
(45) Date of Patent: Aug. 14, 2007

(54) METHOD FOR THE OBSERVATION OF A NUMBER OF OBJECTS

(75) Inventor: Jörg Bümmerstede, Oyten (DE)

(73) Assignee: Atlas Elektronik GmbH, Bremen (DE)

( * ) Notice: Subject to any disclaimer, the term of this patent is extended or adjusted under 35 U.S.C. 154(b) by 155 days.

(21) Appl. No.: 10/521,012

(22) PCT Filed: Jun. 4, 2003

(86) PCT No.: PCT/EP03/05837

§ 371 (c)(1),
(2), (4) Date: Jan. 12, 2005

(87) PCT Pub. No.: WO2004/008173

PCT Pub. Date: Jan. 22, 2004

(65) Prior Publication Data

US 2006/0164293 A1    Jul. 27, 2006

(30) Foreign Application Priority Data

Jul. 13, 2002    (DE)    ................. 102 31 712

(51) Int. Cl.
*G01S 13/66* (2006.01)
(52) U.S. Cl. .............. 342/59; 342/189; 342/195; 342/95
(58) Field of Classification Search .............. 342/59, 342/95–97, 189, 195
See application file for complete search history.

(56) References Cited

U.S. PATENT DOCUMENTS

| | | | | |
|---|---|---|---|---|
| 5,107,271 A | * | 4/1992 | White | .................. 342/195 |
| 5,202,691 A | * | 4/1993 | Hicks | .................. 342/90 |
| 5,268,698 A | * | 12/1993 | Smith et al. | .......... 342/450 |
| 5,365,236 A | * | 11/1994 | Fagarasan et al. | ...... 342/53 |

(Continued)

OTHER PUBLICATIONS

"Track monitoring when tracking with multiple 2D passive sensors", Roecker, J.A. Aerospace and Electronic Systems, IEEE Transactions on vol. 27, Issue 6, Nov. 1991 pp. 872-876.*

(Continued)

*Primary Examiner*—John B. Sotomayor
(74) *Attorney, Agent, or Firm*—Fitch Even Tabin & Flannery; Norman N. Kunitz

(57) ABSTRACT

The invention relates to a method for the observation of a number of objects, which move in a space monitored by a number of sensors, are recorded by the sensors and followed with continuous updating of at least the sensor track defining the kinematics of the object, whereby those provided sensor tracks amongst the sensor tracks from various sensors, which correspond to the same object are automatically assigned to a system track. In order to improve the method with regard to an efficient assignment of the sensor tracks, which is reliable, has a reduced error probability and runs essentially automatically, an assignment of a sensor track to at least one system track is always carried out if a decision on the non-correspondence to the system track can not be securely taken. Subsequently, assigned sensor tracks are continuously monitored for the continued assignment thereof to the assigned system track and on determining the non-correspondence thereof, are removed from said system track. For each system track whose correspondence to a system track is securely excluded, a new system track is generated. The determination of non-correspondence is irreversible.

20 Claims, 2 Drawing Sheets

U.S. PATENT DOCUMENTS

| | | | | |
|---|---|---|---|---|
| 5,374,932 | A * | 12/1994 | Wyschogrod et al. | 342/36 |
| 5,414,643 | A * | 5/1995 | Blackman et al. | 342/95 |
| 5,909,189 | A * | 6/1999 | Blackman et al. | 342/90 |
| 6,002,358 | A * | 12/1999 | Tsang | 342/195 |
| 6,104,345 | A * | 8/2000 | Tweg et al. | 342/417 |
| 6,239,739 | B1 * | 5/2001 | Thomson et al. | 342/96 |
| 6,710,743 | B2 * | 3/2004 | Benner et al. | 342/453 |
| 6,798,381 | B2 * | 9/2004 | Benner et al. | 342/451 |
| 2004/0130620 | A1 * | 7/2004 | Buehler et al. | 348/143 |
| 2005/0196015 | A1 * | 9/2005 | Luo et al. | 382/103 |
| 2006/0164293 | A1 * | 7/2006 | Bummerstede | 342/59 |

OTHER PUBLICATIONS

"Ground target tracking—a historical perspective", Chee-Yee Chong; Garren, D.; Grayson, T.P. Aerospace Conference Proceedings, 2000 IEEE vol. 3, 2000 pp. 433-448.*

"Probability hypothesis density filter for multitarget multisensor tracking", Erdinc, O.; Willett, P.; Bar-Shalom, Y. Information Fusion, 2005 8th Int'l Conference on vol. 1, Jul. 25-28, 2005 pp. 8 pp.*

Blackman, Samuel S,. Multiple-Target Tracking with Radar Applications, Chapter 13—The Use of Multiple Sensors for Multiple-Target Tracking, pp. 357-367, Artech House, Inc., Dedham, Mass., 1986.

Brunet, Muriel et al., "Multisensor Multitarget for Airport Simulation", IASTED International Conference on Applied Simulation and Modelling, Jun. 25-28, 2002, Crete, Greece, pp. 1-5.

Asseo, Sabi J., "Integration of Active and Passive Track Files from Internetted Aircraft fro Enhanced Situation Awareness", Proceedings of the IEEE 1988 National Aerospace and Electronics Conference: NAECON 1988 (Cat. No. 88CH2596-5) Dayton, Ohio, May 23-27, 1988, pp. 242-250 vol. 1, XP010076898 1988, New York.

* cited by examiner

US 7,256,729 B2

METHOD FOR THE OBSERVATION OF A NUMBER OF OBJECTS

CROSS REFERENCE TO RELATED APPLICATION

This application is the National Stage filing under 35 U.S.C. 371 of International Application No. PCT/EP2003/005837, filed Jun. 4, 2003, and claims the priority of German Patent Application No. 102317127, filed Jul. 13, 2002.

BACKGROUND OF THE INVENTION

The invention relates to a method of observing a multitude of objects which move in a space monitored by several sensors, wherein the objects are detected by the sensors and are followed under continuing actualization by sensor tracks that supply object data; and wherein, from the available sensor tracks, those sensor tracks which originate from different sensors and which belong to the same object, are automatically associated with a system track.

Floating platforms, such as surface vessels, are provided with a multitude of various sensors for reconnoitering and monitoring the sea area about the platform as well as the air space thereabove. The sensors deliver measuring results, termed as tracks, concerning the detected objects and continuously update the tracks at time intervals, designated as updating the tracks. Examples of such sensors are navigational radar, long and short range monitoring radar, electro-optical equipment with laser distance measurement, etc. By a track there is meant a set of object data which indicates the position and the velocity vector (the so-called kinematics) of the object as well as classification attributes of the object.

For observing the behavior of the individual objects, the tracks of the individual sensors, termed as sensor tracks, have to be brought together and displayed for an operator in a manner as clearly as possible on a position map which cartographically represents the monitoring space. For this purpose the earlier-noted process associates the tracks of the different sensors (that is, the sensor tracks), inasmuch as they relate to the same object, with a system track which determines the representation of the object on the position map.

According to the earlier-outlined processes, for this purpose always an unequivocal decision of association (positive or negative) has been made and the validity of the decisions has been verified either in fixed time intervals or by updating the sensor tracks. The number of computing operations increases quadratically with the number of the available sensor tracks. Thus, in case of a large number (for example, 1000) objects, a substantial computer capacity is required which would no longer be available for other purposes.

It is an object of the invention to improve a process of the earlier-mentioned type in such a manner that the decision of association is made particularly efficiently, reliably and substantially fully automatically, that is, without an operator's intervention, and further, that it is adapted for the simultaneous handling of a large number of objects with the simultaneous reduction of requirements as concerns computer capacity.

SUMMARY OF THE INVENTION

The above object generally is accomplished according to the invention a method of observing a multitude of objects which move in a space monitored by several sensors; wherein the objects are detected by the sensors and are followed under continuing actualization by sensor tracks that supply object data; wherein, from the available sensor tracks, those sensor tracks which originate from different sensors and which belong to the same object, are automatically associated with a system track; and wherein an association of a sensor track with at least one system track is effected each time a decision concerning a non-belonging to the system track cannot be made with certainty.

The method according to the invention has the advantage that even in case of a great number of simultaneously tracked objects, it provides for a clear positional representation, it requires a small computer capacity and detects with certainty, with a small error probability, the belonging of sensor tracks to the individual objects, because only decisions of certainty are made. Accordingly, physical uncertainties are accepted and displayed until a decision with certainty can be made. For example, a sensor track will be considered to belong to one or more system tracks until no sure decision concerning a "non-belonging" can be made, or, stated differently, its association cannot be excluded with certainty. Such a decision is irreversible at least in the automatic decision process and may be revised—if desired—only by a manual interference by the operator. The thresholds for the decision on "non-belonging" are set in such a manner that a desired balance is established between high efficiency and small error probability. The decision threshold is advantageously set in such a manner that it approximately corresponds to the resolution capability of the sensors which deliver the respective sensor track and sensor system. Such a proceeding has the advantage that, for example, objects which cannot be separated because of the limited resolution capability of the sensors, are considered to be a single object until, in time, they can be differentiated with certainty due to a change of the motion path or due to the detection by a sensor having a greater resolution. Only then will the objects be separated and identified by separate system tracks. Such separate system tracks remain irrevocably present even if later they move parallel to one another for a longer period and for that reason may no longer be distinguished by resolution. In the course of the ongoing examination of the continuance of the association of the sensor tracks that are associated with the system tracks, the sensor tracks are at all times compared only with the system tracks with which they are associated and not with other system tracks with which no association is present. For this reason the number of computer operations increases only linearly with the number of the tracks, so that the required computer capacity remains within limits. By means of the process according to the invention up to 1000 or more objects may be simultaneously observed and for the operator a "clarified position" is made visible in which the objects may be still well recognized and followed.

Expedient methods according to the invention, including further developments and features thereof, are defined in the additional claims.

In accordance with an advantageous embodiment of the invention the continuing examination of the association of a sensor track with a system track is always carried out when the sensor tracks of the sensors are actualized or updated. While a newly occurring sensor track is compared with all the system tracks, an actualized sensor track is examined for a continuance of association only with those system tracks with which it is associated. Since with each system track a leading sensor track is associated, a newly occurring sensor track, as well as an actualized sensor track which is not a leading sensor track, is compared exclusively with the leading sensor track of the system track. By virtue of such a measure the required computer capacity is maintained small for the computing operations to be carried out.

BRIEF DESCRIPTION OF THE DRAWINGS

The invention will be described in further detail with reference to an embodiment illustrated in the drawing where, for explaining the method, a flow chart divided into

DETAILED DESCRIPTION OF THE INVENTION

The method to be described below for observing a multitude of objects which move in a space monitored by several sensors, assumes that the objects are detected by the sensors, that sensor tracks are formed by the detected objects and that the objects are followed by the sensors under continuing actualization of the sensor tracks (also termed as updating). By a sensor track there is meant a data set which identifies the object by its kinematics (which are its position, its direction and its motion) and attributes of classification specific thereto. The sensor tracks supplied by a sensor are provided with a unique identification and a signal identifying the sensor. If a new object is detected by a sensor, the sensor track generated by such an object is provided by the sensor with a not-yet-used identification, for example, with an ascending numbering of all sensor tracks. If the sensor looses contact with an object, then the sensor track is canceled together with its identification. As sensors various radar equipment, preferably having different resolution capabilities, such as long-range and close-range radar and electro-optical equipment, such as daylight and night vision sensors with laser distance measuring devices are customarily utilized.

The multitude of sensor tracks delivered by the different sensors is, according to the invention, cleaned up for the purpose of a clear representation of the position of the different objects, by combining those sensor tracks of the different sensors which originate from one and the same object. Such sensor tracks thus yield but a single track which hereafter is termed as a system track and determines the representation of the object on a position map of the monitored space. The pertaining process to be described below proceeds fully automatically, effects all non-excludable associations and makes possible a simultaneous handling of a multitude of objects without needing an extremely large computer capacity for performing the necessary operations.

Figures 1A, 1B:
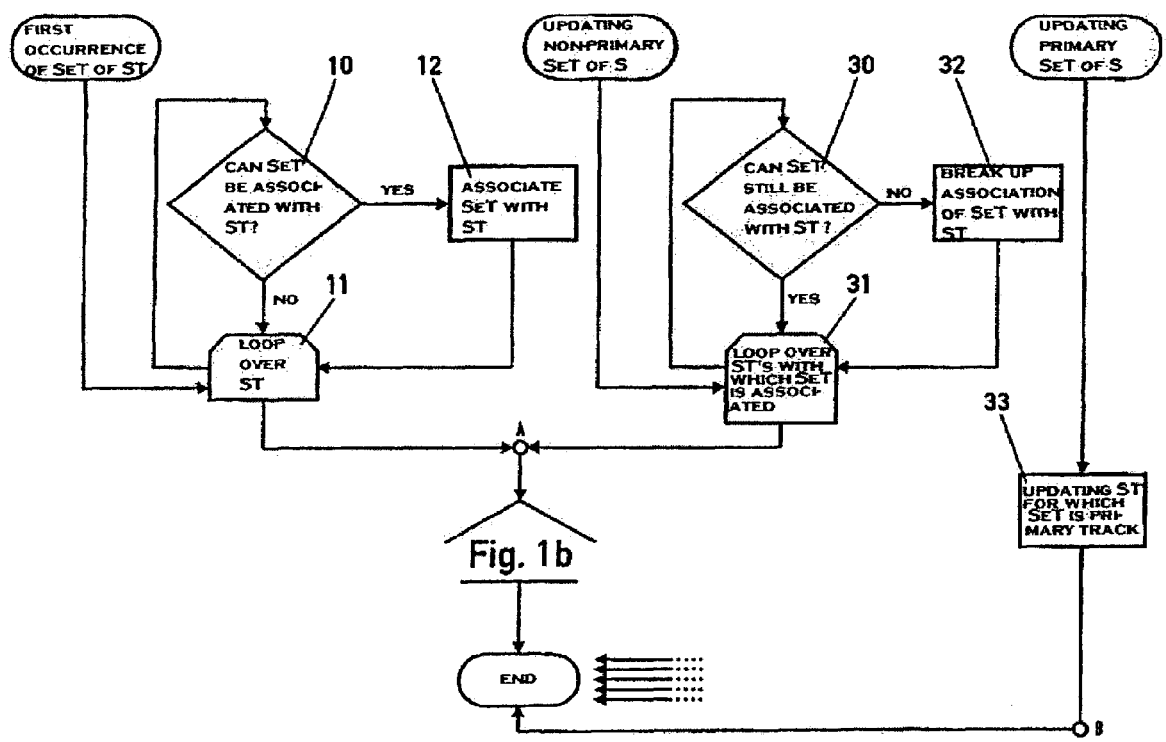
FIGS. 1a and 1b is shown.
Figure 1B:
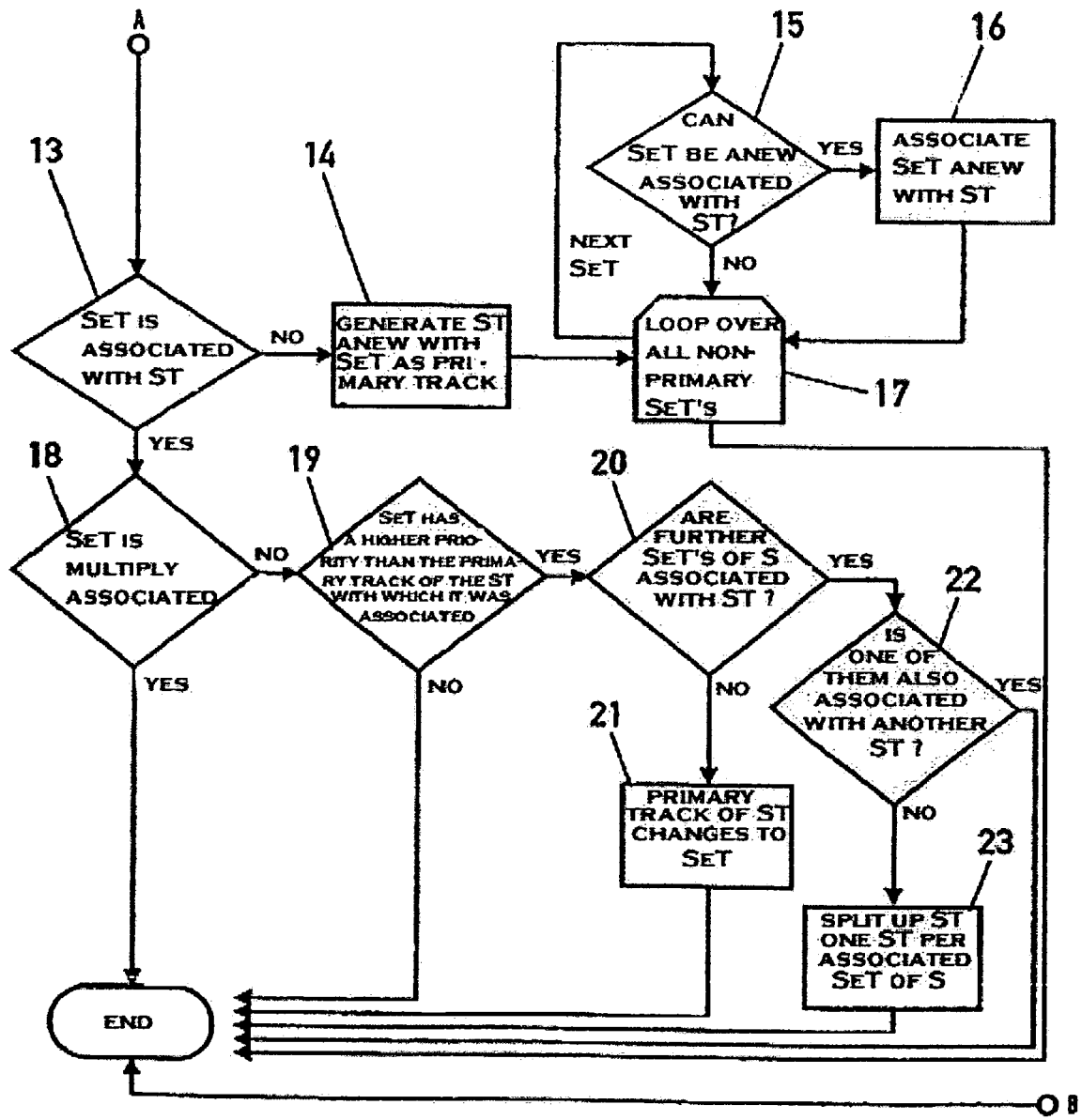

In the method illustrated by way of a flow chart in FIGS. 1a and 1b, an association of a sensor track with at least one system track is effected every time when a decision cannot be made with certainty that the sensor track does not belong to the same object represented by the system track. The thresholds for such a decision are set in such a manner that only a slight probability of error is involved which means that no possible associations are omitted. The threshold is preferably adapted to the respective resolution capability of the two sensors which deliver the sensor track and the leading sensor track of the system track with which the association is examined. The number of associations, however, remains to be clearly perceptible as a rule, because the distance between objects is usually greater than the resolution capability of the sensors. By setting the thresholds a high efficiency is achieved, since the decisions concerning the exclusion of an association with a system track does not need to be revised. A revision of the irreversible decision concerning a non-association may be provided by making a manual interference possible for the operator.

Associated sensor tracks are continuously examined concerning their belonging to the associated system track, and upon determination of non-belonging, the sensor track is removed from the respective system track. An actualized sensor track is checked on belonging only with respect to the associated system track, while a newly occurring sensor track is necessarily compared with all the system tracks. A new system track is generated with each sensor track for which a non-belonging to each system track is determined, be it immediately at the beginning of the occurrence of the sensor track or in the course of a later examination of the sensor track for a continuance of belonging which, in such a case, leads to a removal of the sensor track from the system track. The continuing examination of the belonging of a sensor track to a system track is performed upon each actualization of the sensor tracks in the individual sensors, so that each time always the actualized sensor track is utilized for examining any further association to the system track.

All sensor tracks which become associated with a system track are preserved in the system track. One of the sensor tracks is designated as the leading sensor track (primary track) and the others are designated as subordinate sensor tracks. As to which sensor track is designated as the primary track depends on the ranking of the sensors which deliver the sensor tracks.

During the process the primary track may be replaced under certain conditions. While in the course of examining the belonging of a newly occurring sensor track, the latter is compared solely with the leading sensor tracks of all sensor systems, an actualized, subordinated sensor track is compared only with the respective leading sensor track of the system track with which it is associated. An actualized or updated leading sensor track (primary track) is not examined concerning belonging; rather, its kinematics and possibly its changed attributes are transferred to the system track.

In the flow chart shown in FIGS. 1a and 1b the individual process steps for the decision concerning association are graphically illustrated. The first process steps shown in FIG. 1a depend on whether a sensor track of a sensor occurs for the first time or whether it is an actualized sensor track; whether the actualized sensor track is a primary track or is subordinated, that is, whether in the ranking it has the highest priority or a subordinated priority. The first process steps thus differ from one another in this respect. From the point designated at A in FIG. 1a the further process steps for new and actualized sensor tracks are identical and follow the flow chart illustrated in FIG. 1b.

Referring to the flow chart of FIGS. 1a and 1b, the individual process steps are as follows:

When a sensor delivers a sensor track, the latter is accordingly designated as a sensor track which occurs for the first time, or is designated as an actualized sensor track which has already been present and was renewed (updated) at a later point in time. The actualized sensor track represents an updating of an already known sensor track. In an actualized or updated sensor track a difference is made between a sensor track which is the primary track of a system track and a sensor track which is a subordinated sensor track in one or more system tracks. A sensor track may be a primary track of only a single system track.

A first-occurring sensor track delivered by a sensor is examined in the process step 10, concerning belonging or non-belonging, with all system tracks and is examined in all system tracks only with the leading sensor track or primary track. The sensor track is recognized as belonging to the system track if the sensor which delivers that sensor track does not also deliver the primary track of the system track, further, if the kinematics, that is, the position and velocity vector fit the primary track of the system track and if the attributes of the sensor track and the attributes of the system track are compatible. If based on such examining criteria the sensor track cannot be associated with the system track, that is, an association is excluded with certainty, the next system track is called to the loop 11 for examining belonging. If a belonging is recognized, an association thus cannot be excluded with certainty, and therefore in the process step 12 the sensor track is associated with the system track, and the next system track is called to the loop 11 for a comparison of association, since a plural association of one sensor track with different system tracks is possible.

As may be further seen in the flow chart of FIG. 1*b*, in the process step 13 it is examined, whether or not the new sensor track has been associated with a system track. Should this not be the case, then in the process step 14 with the new sensor track a new system track is generated in which the new sensor track is the primary track. In the next process step 15 all available sensor tracks which are not primary tracks, but are subordinated sensor tracks, are compared with the new system track to determine whether they can be associated with the new system track. The criteria of association are identical to those described earlier. In case the called sensor track may be associated with the new system track, in step 16 the sensor track is associated with the new system track. The already existing association of the sensor track with its system track remains preserved. Subsequently, the next sensor track, which is not a primary track, is called to the loop 17 for comparison. In case a sensor track cannot be associated with the new system track, then again the next, non-primary sensor track is called to the loop 17, for comparison with the new system track.

If the process step 13 determines that the new sensor track is associated with a system track, the process step 18 examines whether a multiple association exists. Should this be the case, no further measure is taken. If, however, the new sensor track is associated only with a single system track, then the process step 19 examines whether the new sensor track has a higher priority than the primary track of the system track with which it has been associated. As already noted, the higher priority is derived from the priority of that sensor in the ranking of the sensors which delivers the new sensor track. In case the new sensor track does not have a higher priority, no further steps need to be taken. In case it does have a higher priority, it is examined in process step 20 whether additional sensor tracks of the same sensor are associated with the system track. Should this not be the case, then the leading function of the primary track of the sensor track is transferred to the new sensor track which is associated with the system track and which thus becomes the primary track of the system track. If the examination reveals that further sensor tracks of the same sensor are associated with the system track, then process step 22 examines whether one of the additional sensor tracks of the same sensor is also associated with another system track. Should this not be the case, then in the next process step 23 the system track is split up, whereby a respective system track for each associated sensor track of the same sensor is obtained.

For the updating of non-primary sensor tracks of sensors, that is, sensor tracks which are subordinated to the primary track as concerns the ranking of the sensors, the following process steps are performed:

In a process step an actualized sensor track is examined, on belonging, with the primary track of the system tracks with which it is associated. If it is determined that a belonging is still present, the next system track with which the actualized sensor track is associated is called to the loop 31, and the process step 30 is repeated. Should the process step 30 find that an association of the actualized sensor track can no longer be maintained, the association is dissolved in the process step 32, and the sensor track is removed. Thereafter, once again, the loop 31 calls for examination the next system track with which the actualized sensor track is associated.

Thereafter for the removed, actualized sensor track the process step 13 examines, in the same manner as for the newly occurring sensor track, whether or not the sensor track remains associated with a system track, so that such an examination are joined, on the one hand, by the additional process steps 14-17 and, on the other hand, by the additional process steps 18-23, as described earlier.

Since in the described process basically no primary tracks of system tracks are compared with one another concerning belonging, a processing of an actualized or updated sensor track which is delivered by a sensor and which is a primary track, is effected by the process step 33. This is performed such that the updated sensor track over-writes the present primary track with the new object data, thus updates the present primary track of the system track, that is, it transfers its kinematics and possibly its attributes to the system track.

The invention claimed is:

1. A method of observing a multitude of objects which move in a space monitored by several sensors wherein: the objects are detected by the sensors and are followed under continuing actualization by sensor tracks that supply object data; from the available sensor tracks, those sensor tracks which originate from different sensors and which belong to the same object, are automatically associated with a system track; an association of a sensor track with at least one system track is effected each time when a decision concerning a non-belonging to the system track cannot be made with certainty; in each system track all associated sensor tracks are held; one of the sensor tracks is designated as the leading sensor track (primary track) and the other sensor tracks are designated as subordinated sensor tracks; and with the leading sensor track, at least the kinematics of the system tracks are determined.

2. The method as defined in claim 1, wherein associated sensor tracks are subsequently continuously examined as to their continuing belonging to the associated system tracks, and are removed from the respective system track upon a determination of non-belonging and that a new system track is generated with each sensor track whose non-belonging to a system track has been determined.

3. The method as defined in claim 2, wherein the examination of the continuance of the belonging of a sensor track to a system track is effected with the actualized sensor track.

4. The method as defined in claim 1, wherein a newly occurring sensor track is examined as to belonging with all the system tracks and an actualized system track is examined as to belonging only with the system tracks with which it is associated.

5. The method as defined in claim 1, wherein the designation of the leading sensor track and the subordinated sensor tracks are effected on the basis of the ranking of the sensors which deliver them.

6. The method as defined in claim 5, wherein a subordinated sensor track which can be associated only with one system track, is examined with the leading sensor track of the system track concerning the ranking of the sensors which delivers them, and in case of a higher rank of the sensor which delivers the subordinated sensor track, the leadership of the leading sensor track in the system track changes over to the subordinated sensor track if no further sensor tracks of the same sensor are associated with the system track.

7. The method as defined in claim 6, wherein in case further sensor tracks of the same sensor are associated with the system track, the system track is split up and a new system track for each further associated sensor track of the same sensor is generated, in case one of the further associated sensor tracks of the same sensor is not itself associated with another system track.

8. The method as defined in claim 1, wherein the examination of belonging of a newly occurring sensor track is effected only with the leading sensor track of the respective system track.

9. The method as defined in claim 1, wherein the examination of belonging of an actualized sensor track, which is a subordinated sensor track, is performed solely with the leading sensor track of the system tracks with which it is associated.

10. The method as defined in claim 1, wherein the leading sensor track of the system track with which it is associated, is changed, as concerns its kinematics and attributes, with an actualized sensor track, which is the leading sensor track.

11. A method for observing a plurality of objects comprising:
 a) detecting and tracking a plurality of objects by sensors in a space monitored by several sensors;
 b) using object data from acquired objects detected by the sensors to form sensor tracks, with the sensor tracks being actualized or updated at certain intervals;
 c) combining sensor tracks from various sensors into system tracks, which represent the respective objects;
 d) considering all sensor tracks to belong and assigning the sensor tracts to one or several system tracks and to remain assigned to these system tracks, and in each system track all assigned sensor tracks are held as long as a decision of non-belonging to the object, represented by the respective system track, cannot be made with certainty;
 e) comparing the actualized sensor tracks only to the system tracks to which they are assigned in order to monitor the continued assignment, and if a non-belonging is determined, separating the sensor track from this system track;
 f) forming a new system track with each sensor track for which a non-belonging has been determined; and,
 g) the decision of non-belonging is not revised.

12. The method as defined in claim 11, wherein: in each system tracks, one of the sensor tracks is designated as the leading sensor track (primary track) and the other sensor tracks are designated as subordinated sensor tracks; and with the leading sensor track, at least the kinematics of the system tracks are determined.

13. The method as defined in claim 12, wherein the designation of the leading sensor track and the subordinated sensor tracks are effected on the basis of the ranking of the sensors which deliver them.

14. The method as defined in claim 13, wherein a subordinated sensor track which can be associated only with one system track, is examined with the leading sensor track of the system track concerning the ranking of the sensors which delivers them, and in case of a higher rank of the sensor which delivers the subordinated sensor track, the leadership of the leading sensor track in the system track changes over to the subordinated sensor track if no further sensor tracks of the same sensor are associated with the system track.

15. The method as defined in claim 14, wherein in case further sensor tracks of the same sensor are associated with the system track, the system track is split up and a new system track for each further associated sensor track of the same sensor is generated, in case one of the further associated sensor tracks of the same sensor is not itself associated with another system track.

16. The method as defined in claim 12, wherein the examination of belonging of a newly occurring sensor track is effected only with the leading sensor track of the respective system track.

17. The method as defined in claim 12, wherein the examination of the continuance of the association of an actualized sensor track, which is a subordinated sensor track, is performed solely with the leading sensor track of the system tracks with which it is associated.

18. The method as defined in claim 12, wherein the leading sensor track of a system track, is changed, as concerns its kinematics and attributes, with an actualized sensor track, which is a leading sensor track and is associated with the system track.

19. The method as defined in claim 12, wherein in a newly generated system track which has only one leading sensor track, all subordinated sensor tracks of the other system tracks are examined with the newly generated system track and associated with the newly generated system track, if the decision of the non-belonging to the newly generated system track cannot be surely made.

20. The method as defined in claim 11, wherein the decision threshold concerning the non-belonging of a sensor track to a system track is measured quasi in accordance with the resolution capability of the sensor delivering the sensor track and the resolution capability of the sensor delivering the leading sensor track to the system track.

* * * * *